United States Patent [19]

Rutledge, Jr. et al.

[11] E Patent Number: Re. 32,865

[45] Reissued Date of Patent: Feb. 14, 1989

[54] FIBERGLASS SUCKER ROD CONSTRUCTION

[75] Inventors: Woodrow T. Rutledge, Jr.; Russell P. Rutledge; Jon B. Freeman; Stephen D. Clark, all of Big Spring, Tex.

[73] Assignee: Fiberflex Products Ltd., Houston, Tex.

[21] Appl. No.: 33,414

[22] Filed: Apr. 1, 1987

Related U.S. Patent Documents

Reissue of:

[64] Patent No.: 4,360,288
Issued: Nov. 23, 1982
Appl. No.: 76,373
Filed: Sep. 17, 1979

[51] Int. Cl.[4] ..... F16B 11/00; F04B 47/02

[52] U.S. Cl. ..... 403/268; 403/267; 403/275; 403/361; 174/176

[58] Field of Search ..... 403/268, 275, 267, 361, 403/266, 265; 174/179, 176, 186, 177

[56] References Cited

U.S. PATENT DOCUMENTS

| | | | |
|---|---|---|---|
| 1,064,764 | 6/1913 | Parker | 403/267 |
| 1,689,281 | 10/1928 | Forssell | 403/265 |
| 2,266,357 | 12/1941 | Cooke | 403/268 X |
| 2,652,231 | 9/1953 | Smith | 403/268 X |
| 2,825,752 | 3/1958 | Knutz et al. | 174/176 X |
| 2,874,937 | 2/1959 | Higgins | 403/265 |
| 2,874,938 | 2/1959 | Higgins | 403/265 |
| 3,018,140 | 1/1962 | Portz et al. | 403/268 X |
| 3,362,731 | 1/1968 | Gasche et al. | 285/212 |
| 3,461,539 | 8/1969 | Napple | 403/268 X |
| 3,477,335 | 11/1969 | Gold et al. | 85/62 |
| 3,534,989 | 10/1970 | Yonkers | 174/176 X |
| 3,549,791 | 12/1970 | Yonkers | 174/179 |
| 3,655,226 | 4/1972 | Cowan | 403/361 X |
| 3,661,388 | 5/1972 | Leslie | 403/265 X |
| 3,737,556 | 6/1973 | Cunningham | 174/19 |
| 4,024,913 | 5/1977 | Grable | 403/275 X |
| 4,127,741 | 11/1978 | Bauer et al. | 403/268 X |
| 4,195,691 | 4/1980 | Newling | 166/378 |
| 4,198,538 | 4/1980 | Lusk | 174/179 X |
| 4,205,926 | 6/1980 | Carlson | 403/275 X |
| 4,315,699 | 2/1982 | Lusk | 403/361 |

FOREIGN PATENT DOCUMENTS

| | | | |
|---|---|---|---|
| 1072191 | 2/1980 | Canada | 403/268 |
| 2511809 | 9/1976 | Fed. Rep. of Germany | 174/179 |
| 1210779 | 10/1959 | France . | |
| 681550 | 10/1952 | United Kingdom | 403/267 |

OTHER PUBLICATIONS

"Fiberglass Sucker Rods in Beam-Pumped Oil Wells", a paper by D. L. Watkins & John Haarsma presented to the SPE-AIME in Nov. 1977 and published in the May 1978 issue of Journal of Petroleum Technology, pp. 731-736.

*Primary Examiner*—James Kee Chi
*Attorney, Agent, or Firm*—Pravel, Gambrell, Hewitt, Kimball & Krieger

[57] ABSTRACT

A fiberglass sucker rod construction is disclosed comprising a cylindrical fiberglass rod having a steel connector member adhesively bonded to each end thereof. The steel connector members are basically identical in their manner of being affixed to each end of the fiberglass rod, each connector member having an internal receptacle defining a series of tapered annular spaces for receiving an epoxy adhesive material which bonds the fiberglass rod in the metal connector member, thereby forming a unitary sucker rod having a male thread connector at one end and a mating female connector at the other end thereof. The epoxy adhesive cures, forming a sleeve having a series of annular tapering surfaces defining annular wedges that are oriented such that tension applied to the rod causes the wedges to be compressed between the rod and connector member, resulting in a radially inwardly directed force to retain the rod in position against such tension.

This is a Reissue of a Patent which was the subject of a Reexamination Certificate No. B1 4,360,288, dated Dec. 13, 1983, Request No. 90/000,318, Jan. 20, 1983.

16 Claims, 1 Drawing Sheet

FIBERGLASS SUCKER ROD CONSTRUCTION

Matter enclosed in heavy brackets [ ] appears in the original patent but forms no part of this reissue specification; matter printed in italics indicates the additions made by reissue.

FIELD OF THE INVENTION

The present invention relates to an improved sucker rod construction, and more particularly to a sucker rod comprising a fiberglass rod portion epoxy bonded to steel connecting members on each end thereof.

BACKGROUND OF THE INVENTION

Steel sucker rods have been used for decades in producing oil wells to actuate petroleum pumps, located in a well bore of a producing, but not pressurized oil well. A series of sucker rods are connected together to form a string extending down into the well bore and are connected to the petroleum pump at one end and to a cyclic or reciprocating drive mechanism at the well head to actuate the petroleum pump to cause oil to be pumped up the well bore and into a pipe line.

Steel sucker rods providing tensile strength to withstand thousands of cyclic axial forces are inherently heavy, thereby requiring a sizable reciprocating drive mechanism at the well head to effectively actuate the pump down in the well bore, which, of course, requires more energy to operate. In addition, the corrosive effects of steel contributed significantly to the cost of oil production, in that steel sucker rods had to be replaced periodically.

It is therefore an object of the present invention to provide a sucker rod construction of considerably less weight than its all-steel counterpart, thereby requiring less energy to operate.

It is another object of the present invention to provide a sucker rod construction having improved corrosion resistant characteristics, thereby greatly extending the useful life thereof.

It is a further object of the present invention to provide an improved sucker rod construction having improved elasticity characteristics, resulting in increased efficiency.

SUMMARY OF THE INVENTION

The present invention is directed to a sucker rod comprising:

(1) A cylindrical fiberglass rod, (2) A steel connecting member affixed to each end thereof, (3) A collet positioned about the fiberglass rod and threadedly engaging each connecting member so as to retain the rod in functional engagement with each of the connecting members, and (4) A quantity of adhesive material positioned within an annular chamber defined by the end of the fiberglass rod inserted into an axial elongate receptacle of each of the connecting members.

Each of the connecting members receptacles is defined by a series of outwardly converging tapered surfaces which are filled with the adhesive material to bond or otherwise steel connector member. These annular converging surfaces are tapered such that a tension load along the axis of the fiberglass rod creates a wedge or cam-like effect to direct a compression force radially inwardly through the adhesive material toward the rod axis to retain the fiberglass rod in position within each of the steel connecting members against such tension load.

*The wall of each connecting member laterally adjacent the tapered internal surface nearest the portion of the rod outside the receptacle is gradually tapered so that the wall is less thick near its portion adjacent the receptacle opening than at portions nearer and laterally adjacent the upper reach of that tapered internal surface.*

BRIEF DESCRIPTION OF THE DRAWINGS

Other objects and advantages of the invention will become apparent upon reading the following detailed description and upon reference to the drawing, in which.

DETAILED DESCRIPTION OF THE PREFERRED EMBODIMENT

Figure 1:
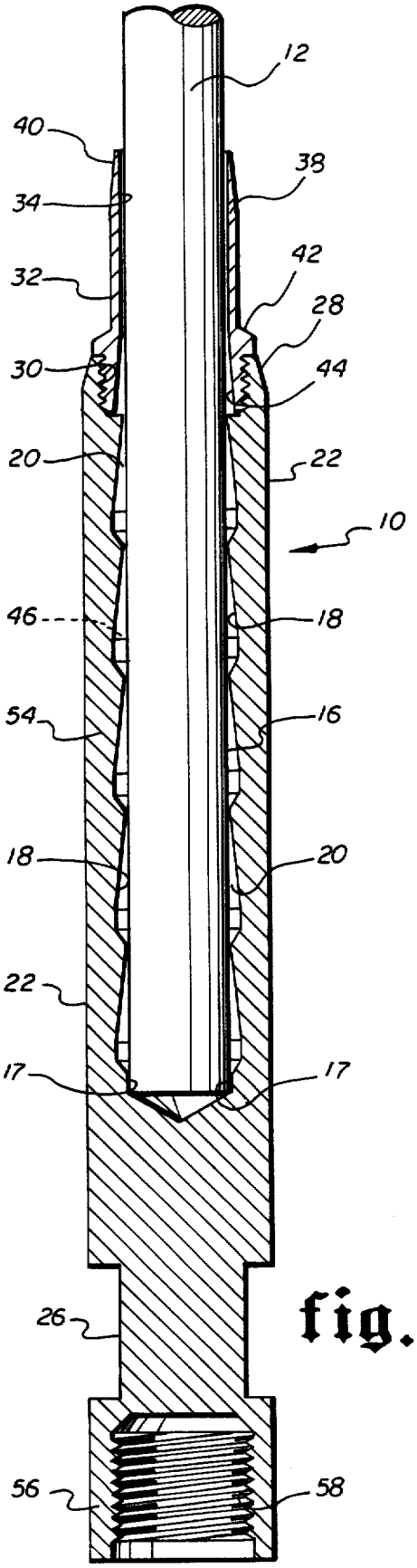
FIG. 1 is a vertical sectional view of a first connecting member and fiberglass rod end of the sucker rod of the present invention.
Figure 2:
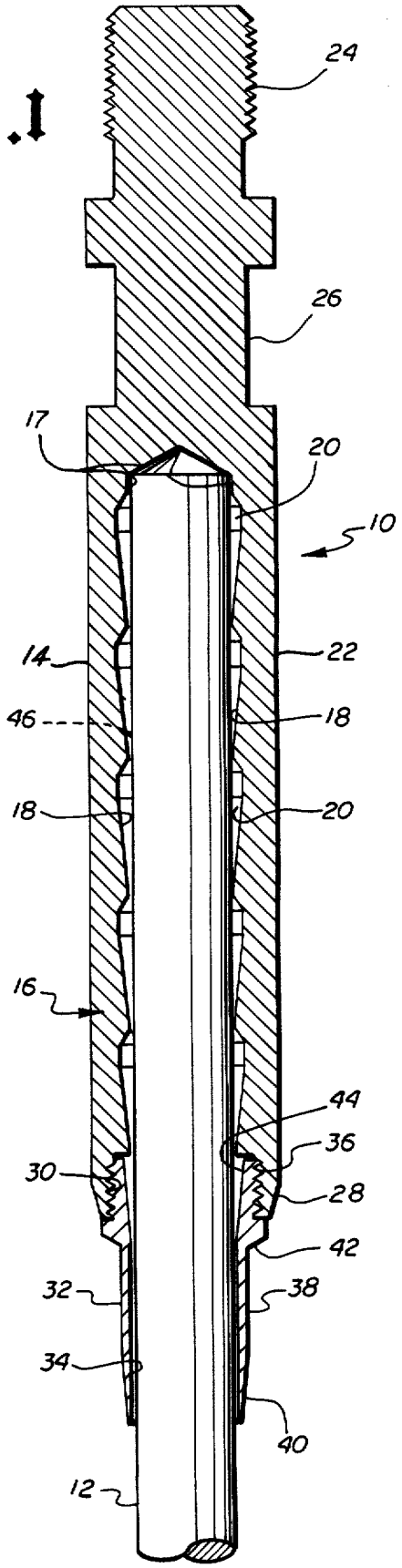
FIG. 2 is a vertical sectional view of the second connecting member and fiberglass rod end of the sucker rod of the present invention.

Referring now to the drawings and first to FIG. 1, a sucker rod 10 of the present invention is shown. The sucker rod 10 comprises a cylindrical rod element 12 (partially shown in FIG. 1 and FIG. 2), and first and second connector members 14 and 54, respectively. The first and second connectors members 14 and 54 are basically identical, except for the gender of their threaded couplings. Therefore the first connector member 14 and its method of attachment to the cylindrical rod element 12, will be described in detail, with the understanding that a like description should also apply to the second connector member 54 and its method of attachment to the cylindrical rod element.

As shown in FIG. 1, the first connector member 14 is formed to define an axial receptacle 16 for receiving a first end of the sucker rod cylindrical element 12. The axial receptacle 16 is defined by a series of *axially spaced apart* outwardly converging tapered surfaces 18, *as illustrated, of substantially equal angles of taper,* which cooperate with the external cylindrical surface of the rod element 12 to further define a series of wedge shaped or tapered annuluses 20 about the rod element when the rod element is in position as shown. *The base frustrums of these outwardly converging tapered frustoconical internal surfaces, as illustrated, have equal diameters, and immediately adjacent to the plane of such base frustrums are cylindrical internal surfaces or lands which have a diameter equal to the diameter of such base frustrums.* The connector member 14 includes an external cylindrical surface 22 terminating in an externally threaded end 24 for threadedly engaging the next successive sucker rod to define a string of sucker rods for lowering into a well bore. The first connector member 14 also includes a pair of diametrically opposite flat surfaces 26 for enabling an oil field operator to attach a standard sucker rod wrench thereto for connecting and/or disconnecting the individual sucker rods 10 from one another.

The first connector member 14 includes a chamfered surface 28 located at the end adjacent the rod element 12, the function of such chamfered surface to be described hereinbelow. An internally threaded section 30 is located adjacent the chamfered surface 28 for threadedly receiving a first collet 32 therein to align the cylindrical rod element 12 with the first connctor member 14.

The collet 32 includes a bore 34 therethrough for receiving an end of the cylindrical rod element 12, and also includes external engaging threads 36 for engaging mating threads 30 of the first connector member 14 to retain the collet in position, which in turn retains the cylindrical rod element 12 in alignment within the first connector member. The first collect 32 is basically cylindrical shaped, having an exterior cylindrical surface 38, terminating at one end in a first chamfered surface 40 and at the opposite end in a second chamfered surface 42, which second chamfered surface cooperates with chamfered surface 28 of the first connector member, the function of which will be described hereinbelow. The first collet 32 also includes an annular converging tapered surface 44 integrally formed with the internal bore 34 therethrough, which functions in a manner identical to the annular outwardly converging tapered surfaces 18 of the first connector member 14.

The sucker rod construction of the present invention includes a sufficient quantity of adhesive material 46 to completely fill the annuluses 20 defined by the first connector member outwardly converging tapered surfaces 18 and the outer cylindrical surface of the rod element 12 for adhering or otherwise interconnecting the fiberglass rod cylindrical rod element 12 to the steel connector member 14. Initially in a liquid state, this adhesive material 46 is poured into the connecting member axial receptacle 16. Next, the fiberglass rod 12 is inserted into the receptacle, displacing much of the liquid adhesive 46 and forcing it into the annulus surrounding the rod, where it subsequently cures, forming an annular wedge which is bonded to the rod and the receptacle tapered surface 18.

The sucker rod construction of the present invention also includes a second connector member 54 at the opposite end of the rod element 12 from the first connector member 14. The second connector member 54 is essentially identical to the first connector member; therefore, the same reference numerals are used to indicate identical parts on each connector 14 and 54. The difference between the first and second connector members 14 and 54 is the gender of their mating threaded connections: the first connector member 14 (FIG. 1) is a male member having an external threaded end 24, and the second connector member 54 (FIG. 2) incorporates a housing 56 having female internal threads 58 for engaging the externally threaded end 24 of the first (male) connector member of the next successive sucker rod.

As best shown in the drawings, the sucker rod construction 10 of the present invention is formed by positioning the cylindrical rod element 12 within the first connector member axial receptacle 16, threadedly inserting the first collet 32 in position about the cylindrical rod element and into the first connector member. The end of the rod 12 is in close fitting relation with a blind bore 17 defining the end portion of the receptacle 16. Likewise, the outer cylindrical surface of the rod is in close fitting relation with the collet bore 34. Those skilled in the art will readily appreciate that these spaced points of close fitting engagement function to align the rod 17 concentric with the collet 32 and connector member 14.

The cylindrical rod element 12 is held in position within the connector member 14 or 54 by a body of adhesive material which fills the annular chamber defined by the cylindrical rod element exterior surface and the series of connector member outwardly converging tapered surfaces 18. In constructing the fiberglass rod sucker rod 10 of the present invention, it is preferable to introduce a suitable quantity of adhesive material 46, in its initial liquid state, into the connector member receptacle 16 prior to the insertion of the cylindrical rod element 12. As aforementioned, inserting the rod 12 into the receptacle 16 forces the liquid adhesive into the annular chamber surrounding the rod. With the rod 12 in position within the connector receptacle 16, the collet member 32 is next positioned about the rod to threadedly engage the connector member 14 or 54. As best shown in the drawings, as the collet 32 is screwed into position, its annular converging tapered surface 44 serves to compress any residual liquid adhesive material 46 within the annular chamber and otherwise squeeze any excess material out into the annulus defined by the exterior surface of the cylindrical rod 12 and the collet bore 34.

As shown in the drawings, when the adhesive material 46 cures, it forms a sleeve having a series of *axially spaced apart* annular tapering surfaces defining a series of annular wedges positioned between the rod 12 and the receptacle tapered surfaces 18. This hardened adhesive sleeve 46 forms a bond with the fiberglass rod 12 to resist the shear force resulting when tension is applied to the rod, as if to withdraw it from the connector member. Additionally, tension applied to the rod 12 causes the annular wedges of cured adhesive material 46 to be forced into compressive engagement with the rod outer cylindrical surface and with the connector member tapered surfaces 18 and with the collet tapered surface 44. This results in a compression force directed radially inwardly to the center line axis of the rod 12 to compress the annular wedges of adhesive material 46 against the rod to retain the rod in position with the connection member against the action of such tension applied to the rod.

The second connector member 54 is interconnected to the opposite end of the cylindrical rod element 12 in an identical manner to form a sucker rod construction 10 having a male connector member 14 at one end thereof and a female connector 54 at the other end thereof.

In operation, a plurality of sucker rods 10 of the present invention are interconnected to form a string extending down into the well bore and are connected to a pump positioned in the oil bearing region of the well bore at the lower end thereof. The upper end of the sucker rod string is connected to a device for providing reciprocating pump action to the sucker rod string, and the sucker rods are used in the customary manner to actuate the pump to produce oil from the producing, but otherwise unpressurized oil well.

The abovementioned chamfered surfaces 40, 42 and 28 on the collet 32 and connector members 14 and 54 provide a gradual taper from the smaller diameter of the fiberglass sucker rod to the larger diameter of the connector members, in order to prevent the sucker rod from binding or otherwise catching the connector member on pipe or casing joints within the well bore or at the well head as the sucker rod cycles back and forth within the well bore.

The fiberglass sucker rod construction of the present invention imparts an elasticity to the sucker rod string not found in conventional all-steel sucker rods. In a reciprocating environment, this elasticity inherent in pre-stressed fiberglass, results in an increased effective stroke length, and an increased stroking force over that of a steel rod having a comparable surface stroke. This effect is best illustrated by observing the effect of a rubber band having a weight affixed to its lower end. As the upper end cycles through a reciprocating vertical movement of specified stroke length, it will be seen that the weight at the lower end of the rubber band experiences a stroke length greater than that of the upper end of the rubber band. In a cyclic condition, the weight on the rubber band creates a lower downstroke, due to the elasticity of the rubber band, and a higher upstroke, due to the resiliency of the rubber band, than a like weight on a comparable inelastic material. Obviously, the rubber band illustration results in a much more drastic effect than a fiberglass sucker rod; however, the principle is the same and therefore the effect is the same although on a smaller scale, resulting in increased production from a string of fiberglass sucker rods as compared to a string of all-steel sucker rods due to the increased pump stroke that is obtained.

The fiberglass sucker rod of the present invention may also be used with lighter weight, less expensive surface equipment, because the sucker rod itself is lighter weight and requires less structure and less energy to reciprocate a given length of fiberglass rod within the well bore than a comparable length of all-steel sucker rod. Additionally, the lighter weight fiberglass sucker rod results in greater ease of handling for oil field surface crews.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

The invention having been described, what is claimed is:

1. A sucker rod construction for use in producing oil wells, said sucker rod construction comprising:

a [first] connector member *having an outer surface and* being formed to define a rod receptacle having a closed axially [outer] *inner* end and an open axially [inner] *outer* end, said rod receptacle having a plurality of integrally formed axially spaced apart outwardly converging tapered frusto-conical [annular] annular *internal* surfaces, [each of said surfaces having substantially the same taper] each of said surfaces having substantially the same taper, *said outer surface of said connector member and said internal surfaces defining between them a rod receptacle wall, said outer surface being substantially cylindrical laterally adjacent all said frusto-conical internal surfaces except the one most near said axially outer open end of said rod receptacle, the outside surface of the connector member laterally adjacent that one internal surface most near the said open end having a gradual axially convergent taper whereby the rod receptacle wall along said one internal surface is less thick at portions nearer said open end than at portions nearer and laterally adjacent the axially upper reach of said one internal surface;* a cylindrical fiberglass rod having an end having a uniformly cylindrical uninterrupted outer surface being received within said rod receptacle through said [inner] *outer* end and cooperating therewith to define an annular chamber between said outer surface of said end of said rod and said outwardly converging tapered frusto-conical surfaces;

and a body of initially liquid adhesive material filling said annular chamber that cures to bond to said outer surface of said end of said rod and to harden to form a plurality of shear and compression resistant frusto-conical wedges to cooperate with said frusto-conical surfaces.

2. The sucker rod construction as set forth in claim 1, including a collet connected to said connector member adjacent said open axially [inner] *outer* end of said rod receptacle and having an axial bore therethrough retaining said end of said rod in coaxial position within said rod receptacle.

3. The sucker rod construction as claimed in claim 1, including:

a bore coaxially formed in said [first] connector member adjacent said axially outer] *inner* closed end of said rod receptacle [outwardly] *axially inward* of said frusto-conical [annular] surfaces, said bore fitting closely with said surface of said end of said rod;

a collet connected to said [first] connector member adjacent said axially outer open end of said rod receptacle, said collet having a passage therethrough coaxial with said rod receptacle, said passage fitting closely with said surface of said end of said rod, whereby said bore and said collet support said end of said rod at axially spaced apart points coaxially within said rod receptacle.

4. The sucker rod construction as claimed in claim 3, wherein [said first connector member has a cylindrical outer surface and] said collet includes an axially extending tubular portion having an outside diameter [substantially less] *not greater* than the outside diameter of *the portion of* said first connector member *laterally adjacent said open end of said rod receptacle.*

5. The sucker rod construction as claimed in claim 3, wherein said collet and said first connector member are formed of substantially the same metallic material.

[6. The sucker rod construction as claimed in claim 1, wherein said axially inner open end of said rod receptacle includes an internally threaded portion and said construction further comprises a collet having an upper portion threadedly engaged with said threaded portion and a lower axially extending tubular portion having a passage therethrough coaxially aligned with said rod receptacle closely engaging said rod.]

[7. The sucker rod construction as claimed in claim 6, wherein said tubular portion includes an axially upper portion having a cylindrical outer surface having a diameter less than the outer diameter of said first connector member, and an axially lower portion having a frusto-conical outer surface sloping from said cylindrical outer surface toward said rod.]

[8. The sucker rod construction as claimed in claim 7, wherein said collet includes an outwardly tapering frusto-conical inner surface positioned outwardly of said tubular portion.]

9. A sucker rod, which comprises:

a *first* connector *having an outer surface and* formed to define a receptacle including an axially [outer] *inner* closed end and an axially [inner] *outer* open end, said receptacle including a plurality of integrally formed axially spaced apart *outwardly converging tapered* frusto-conical internal surfaces, [each of said frusto-conical surfaces having substantially same angle of taper with respect to the axis of said connector] each of said frusto-conical surfaces having substantially the same angle of taper with respect to the axis of each said connector, *said outer surface of said first connector and said internal surfaces defining between them a rod receptacle wall, said outer surface being substantially cylindrical laterally adjacent all said frusto-conical internal surfaces except the one most near said axially outer open end of said rod receptacle, the outside surface of the first connector laterally adjacent that one internal surface most near the said open end having a gradual axially convergent taper whereby the rod receptacle wall along said one internal surface is less thick at portions nearer said open end than at portions nearer and laterally adjacent the axially innermost reach of said one internal surface*, said connector including an integrally formed threaded coupling member;

*a second connector identical to said first connector, a cylincrical* fiberglass rod including [an end] *distal ends, each* end having a uniformly cylindrical uninterrupted outer surface contained within [said receptacle] *one of said first and second connector receptacles* and extending through said open end of said receptacle;

a *first* connected to said *first* connector adjacent said open end of said receptacle *thereof*, said collet having a passage therethrough coaxial with said receptacle and closely fitting with said outer surface of said rod, said collet including a tubular portion extending axially along said outer surface of said rod, said tubular portion having an outside diameter *not greater* than the outside diameter of said connector *laterally adjacent said open end of said rod receptacle;*

*a second collet identical to said first collet connected to said second connector identically as said first collet is connected to said first connector:* a quantity of shear and compression resistant adhesive material bonded to said surface of said [rod] *distal ends of said rods contained within said receptacles* and filling the volume about said surface of said rod and bounded by said [receptacle] *receptacles* and said [collet] *collets.*

10. The sucker rod as claimed in claim 9, wherein said receptacle includes a bore adjacent said closed end and closely fitting said surface of said end of said rod.

*11. The sucker rod construction as claimed in claim 1, including a collet connected to said rod receptacle and comprising a coaxially extending tubular sleeve having an outside diameter not greater than the outside diameter of the portion of said connector member laterally adjacent said open end of said rod receptacle, for fitting closely throughout the sleeve length about a cylindrical surface of the portion of said rod which proximately extends from said rod receptacle.*

[[*12. The sucker rod construction of claim 1, wherein said frusto-conical internal surfaces each have substantially the same angle of taper.*]]

*13. The sucker rod construction as set forth in claim 1* [[*or 12*]] *wherein the base frustrums of said outwardly converging tapered frusto-conical internal surfaces have equal diameters, and wherein said frusto-conical internal surfaces are axially spaced apart partially by a cylindrical internal surface of said rod receptacle which has a diameter equal to the diameter of said base frustrums.*

[[*14. An assembly which comprises:*

*a metallic connector member having an outer surface and including a rod receptacle having an axially inner closed end and an axially outer open end, said rod receptacle including a plurality of integrally formed axially spaced apart frusto-conical internal surfaces, each tapering outwardly convergently, said outer surface of said connector member and said internal surfaces defining between them a rod receptacle wall, said connector outer surface being substantially cylindrical laterally adjacent all said frusto-conical internal surfaces except the one most near said axially outer open end of said rod receptacle, the connector member outside surface laterally adjacent that one internal surface most near the said open end having a gradual axially convergent taper whereby the rod receptacle wall along said one internal surface is less thick at portions nearer said open end than at portions nearer and laterally adjacent the axially innermost reach of said one internal surface;*

*a resin bonded glass fiber reinforced rod including an end having a uniformly cylindrical uninterrupted outer surface contained within said rod receptacle and extending through said open end, and*

*a body of shear and compression resistant adhesive material bonded to the cylindrical surface of said rod within said rod receptacle in the form of a plurality of frusto-conical wedges in cooperating engagement with said frusto-conical internal surfaces of said rod receptacle.*]]

[[*15. The assembly of claim 14, wherein said frusto-conical internal surfaces each have substantially the same angle of taper.*]]

*16. The assembly as set forth in claim* [[*14 or 15*]] 1, *wherein the base frustrums of said outwardly converging tapered frusto-conical internal surfaces have equal diameters, and wherein said frusto-conical internal surfaces are axially spaced apart partially by a cylindrical internal surface of said rod receptacle which has a diamater equal to the diameter of said base frustrums.*

* * * * *

UNITED STATES PATENT AND TRADEMARK OFFICE

CERTIFICATE OF CORRECTION

PATENT NO. : Re. 32,865

DATED : February 14, 1989

INVENTOR(S) : Rutledge, Jr. et al

It is certified that error appears in the above-identified patent and that said Letters Patent is hereby corrected as shown below:

| | |
|---|---|
| Column 1, Line 64: | between "otherwise" and "steel connector member" insert "interlock the end of the fiberglass rod to the respective" |
| Column 3, Line 9: | after "The first" insert "collet" and delete "collect" |
| Column 4, Line 2: | delete "rod" |
| Column 4, Line 36: | after "position" insert "within" and delete "with" |
| Column 6, Line 18: | In front of "outer]" insert a bracket |
| Column 7, Line 25: | after "a first" insert "collet" |

Signed and Sealed this

Twenty-fifth Day of July, 1989

*Attest:*

*Attesting Officer*

DONALD J. QUIGG

*Commissioner of Patents and Trademarks*